(12) United States Patent
Ng (10) Patent No.: US 11,858,639 B2
(45) Date of Patent: Jan. 2, 2024

(54) AIRCRAFT PASSENGER ROOM (71) Applicant: SINGAPORE AIRLINES LIMITED, Singapore (SG)

(72) Inventor: Yung Han Ng, Singapore (SG)

(73) Assignee: SINGAPORE AIRLINES LIMITED, Singapore (SG)

( * ) Notice: Subject to any disclaimer, the term of this patent is extended or adjusted under 35 U.S.C. 154(b) by 647 days.

(21) Appl. No.: 16/648,925

(22) PCT Filed: Sep. 20, 2017

(86) PCT No.: PCT/SG2017/050475
§ 371 (c)(1),
(2) Date: Mar. 19, 2020

(87) PCT Pub. No.: WO2019/059841
PCT Pub. Date: Mar. 28, 2019

(65) Prior Publication Data
US 2020/0247547 A1    Aug. 6, 2020

(51) Int. Cl.
B64D 11/06 (2006.01)
B60Q 3/44 (2017.01)

(52) U.S. Cl.
CPC ............ B64D 11/0604 (2014.12); B60Q 3/44 (2017.02); B64D 11/064 (2014.12); B64D 11/0605 (2014.12); B64D 11/0606 (2014.12)

(58) Field of Classification Search
CPC ............ B64D 11/0604; B64D 11/0605; B64D 11/0606
See application file for complete search history.

(56) References Cited

U.S. PATENT DOCUMENTS

| 10,920,418 | B2* | 2/2021 | Gosling | A47C 9/06 |
| 11,679,881 | B2* | 6/2023 | White | B64D 11/0605 |
| | | | | 244/118.6 |
| 2001/0000639 | A1 | 5/2001 | Park et al. | |
| 2003/0075965 | A1 | 4/2003 | Pham et al. | |
| 2005/0001097 | A1 | 1/2005 | Saint-Jalmes | |
| 2005/0151405 | A1 | 7/2005 | Dowty et al. | |
| 2009/0146004 | A1* | 6/2009 | Plant | B64D 11/0643 |
| | | | | 244/118.5 |
| 2011/0175422 | A1 | 7/2011 | Bruck | |
| 2011/0210205 | A1* | 9/2011 | Bock | B64D 11/0636 |
| | | | | 244/118.6 |
| 2011/0253838 | A1 | 10/2011 | Bettell | |

(Continued)

FOREIGN PATENT DOCUMENTS

| EP | 2 783 983 A1 | 10/2014 | |
| WO | WO-2018015728 A1 * | 1/2018 | ......... B64D 11/0604 |

OTHER PUBLICATIONS

Imper Exclusivas, https://www.youtube.com/watch?v=wKTybmTN_tw, Published Oct. 9, 2013 (Year: 2013).*

(Continued)

Primary Examiner — Timothy D Collins
Assistant Examiner — Terri L Filosi
(74) Attorney, Agent, or Firm — Sughrue Mion, PLLC (57) ABSTRACT An aircraft includes at least one passenger room (3). The room has a passenger chair (5) and a bed (7). These are separate units and can be used at the same time without one unit interfering with or restricting the full range of operations of the other unit and vice versa.

34 Claims, 10 Drawing Sheets (56) References Cited

U.S. PATENT DOCUMENTS

| | | |
|---|---|---|
| 2014/0084647 A1 | 3/2014 | Darbyshire et al. |
| 2016/0052633 A1 | 2/2016 | Lawson et al. |
| 2016/0144964 A1 | 5/2016 | Braca et al. |
| 2017/0043876 A1 | 2/2017 | Oleson et al. |
| 2018/0029532 A1* | 2/2018 | Hasegawa ................ B60Q 3/44 |
| 2018/0304773 A1* | 10/2018 | Lerouge ............... B64D 11/064 |

OTHER PUBLICATIONS

Jim Wilson, Hotels in the Sky, Popular Mechanics, Published Mar. 2001 (Year: 2001).*

International Search Report for PCT/SG2017/050475 dated Nov. 8, 2017 [PCT/ISA/210].

Written Opinion for PCT/SG2017/050475 dated Nov. 8, 2017 [PCT/ISA/237].

* cited by examiner

AIRCRAFT PASSENGER ROOM

CROSS REFERENCE TO RELATED APPLICATIONS

This application is a National Stage of International Application No. PCT/SCP017/050475 filed Sep. 20, 2017.

TECHNICAL FIELD

The invention relates to a passenger room for an aircraft.

The invention also relates to an aircraft that includes at least one passenger room in accordance with the invention.

It is noted that the terms "aircraft", and "aeroplane" and "plane" are used interchangeably herein.

BACKGROUND

Providing high quality environments for passengers in higher fare categories is a significant issue for airlines.

Current passenger environments on aircraft for higher fare category passengers are limited in terms of chair and/or bed positions and interior lighting options. These are especially critical considerations for high fare category passengers on long-haul flights ranging from 6-18 hours, particularly in the context of rising expectations of passengers for comfort and technology options and having regard to comparisons to luxury hotel rooms.

From a practical perspective, excessive weight will ultimately compromise an aircraft's range and excessive chair/bed space (volume) per passenger will restrict the number of passengers an aircraft can transport, thus having a potential to negatively impact competitive pricing. The limited weight and space constraints of aircraft mean that there is a limited footprint for different passenger environments on an aircraft and inevitably this has a significant impact on the design options for airlines.

Determining an optimal amount of space dedicated to passengers across all fare categories for a given weight is a perennial struggle for all airlines.

The quality and range of the passenger chair/bed options for passengers at the higher fare categories has a significant impact on reputation and revenue of airlines and cannot be overlooked by airlines. Many passengers on long haul flights make decisions on airline selection based on the comfort levels and technology options of aircraft.

Several known options for passenger environments for higher fare category passengers are as follows:
(a) Chairs that can be converted into beds with multiple intermediate position—a good solution to allow a passenger to rotate amongst a few comfortable positions but the passenger still has overall limited space to move.
(b) Swivel chairs with limited rotation angles—a good attempt as multiple positions facilitate passenger comfort but possible angles are still very limited.
(c) A passenger area divided into different rooms to offer on-air apartment experience—a huge impact in terms of space offering, but at an extremely high footprint and monetary cost.
(d) A dedicated lounge located next to a passenger seating area—a good alternative to have a social area but this solution is not dedicated to the passenger and ranks low on exclusivity and novelty.

Further factors influencing passenger environments on aircraft are a passenger's ability to interact with a fellow traveller or conversely to avoid unwanted interaction with adjacent passengers.

The invention was conceived with these shortcomings in mind.

The above description is not to be taken as an admission of the common general knowledge in Australia and elsewhere.

SUMMARY OF THE INVENTION

The invention is an aircraft that has an enclosed room for a passenger, with the room having a passenger chair and a bed that are separate units and can be used at the same time.

More particularly, the invention is a layout of a room on an aircraft with two key pieces of furniture, namely a chair and a bed, provided as separate independently operable units that are designed and positioned such that both can be used at the same time without one unit interfering with the other unit and vice versa. This is achieved by appropriate selection of the room size and shape and the section of the positions of the chair and the bed in the room.

Even though the room takes up more space for a passenger than the known passenger environments described above, the passenger living space is modeled after an all-encompassing home experience with lounge, dining room and bedroom configurations and provides a step change in passenger comfort and flexibility. Passengers can choose to sit, lie down or stand as they please, without having to wait for or commit to a single position.

In broad terms, the invention provides an aircraft that includes at least one passenger room in the aircraft, with the room being defined by a perimeter wall that encloses a passenger space, the wall including a section of a side of the aircraft and an internal wall with an opening (that may be closed by a door) to allow access to and from the room, and with the room including a passenger chair and a bed that are separate units that can be used at the same time without one unit interfering with the other unit and vice versa.

While other airlines offer a convertible chair/bed, the solution of the subject invention is a completely different approach which offers the flexibility of multiple space configurations, including chair and bed positions for passengers who would like to choose to stand, sit or lie down, with the multiple space configurations being independent of each other in that it is not necessary to reposition the chair to move the bed into an operative position and vice versa.

The chair may be adapted to swivel about a vertical axis for example to rotate the chair to a number of different functional orientations within the room. The extent of the swivel may be at least 90. The extent of the swivel may be at least 120. The swivel may be up to 135. The swivel may be up to 205. The swivel may be up to 270

The chair may be adapted to recline between an upright position and a reclined position. A passenger may select any recline angle between the upright position and a maximum recline angle. The maximum recline angle may be up to 45. The maximum recline angle may be any suitable angle.

The bed may be moveable between a stowed position that has a minimal footprint in the passenger space and an operative position in which the bed defines a sleeping platform within the passenger space.

By way of example, the stowed position may be a vertical orientation along a longer edge of the bed.

With the above-described arrangement, there is considerable functionality of both the chair and the bed, with the chair having significant swivel and tilt adjustability and the bed being foldable from the vertical stowed position to the operative position within the passenger space.

The room may include a storage cassette for storing the bed in a vertical orientation along a longer edge of the bed in the stowed position, with the bed being moveable between the stowed position in the cassette and the operative position in which the bed defines the sleeping platform within the passenger space.

The bed may include a lift-assist mechanism for assisting movement of the bed from the stowed position to the operative position. The lift-assist mechanism may be at opposite ends of the bed. The lift-assist mechanism may include one or more than one spring unit that is in an extended position when the bed is in the stowed position and can provide a positive upward force to assist movement of the bed from the stowed position to the operative position. The spring unit may be a spring retractable reel unit that includes a coiled spring fixed to the aircraft and a line that connects the coiled spring and the bed.

The bed may include a cantilever assembly for supporting the bed in the operative position. The cantilever assembly may be any suitable assembly.

The room may include members for supporting opposite ends of the bed when the bed is in the operative position. When the bed includes the above-mentioned cantilever assembly, these members provide additional support for the bed when the bed is in the operative position. The members may be connected to the perimeter wall.

The bed may be positioned so that the bed extends lengthwise inwardly from the side of the aircraft into the passenger space when the bed is in the operative position.

The bed may be positioned against a section of the perimeter wall that extends inwardly from the side of the aircraft in the stowed position. In other words, the bed may be positioned to extend generally perpendicular to the length of the aircraft.

The room may include a section of the perimeter wall that is a common wall between the room and an adjacent room.

The common wall may be an extendible/retractable wall such that the wall can be extended or retracted between a lowered position and a retracted position.

The extendible/retractable wall may include a plurality of panels arranged to telescope together.

The beds of the adjacent rooms may be positioned against the common wall. With this arrangement, when the extendible/retractable wall is in the retracted position, the beds may be moved from the stowed positions to the operative positions and in the operative positions define a double bed arrangement.

The room may include a door for closing the opening in the internal wall. The door may be a sliding door. The door may be any other suitable type of door.

The internal wall of the perimeter wall may be any suitable height. Typically, the internal wall is at least 1.6 m, more typically at least 1.7 m, high.

The room may include at least one wall lamp that integrates an ambient light and an additional independently controllable task light in one unit, with the task light being movable between a stowed position and multiple operative positions.

The task light may include upward and downward tilt functionality.

The task light may include side to side tilt functionality.

The room may include a Wireless Seat Control Unit ("WSCU") for remotely operating each of the ambient light and the task light of the wall lamp.

The room may include a credenza positioned to extend along a section of the side of the aircraft. The chair may be positioned in relation to the credenza so that when the passenger is seated on the chair the passenger can use the credenza, for example by accessing storage compartments in the credenza. More particularly, the passenger may swivel the chair to move the chair so that the passenger faces the credenza.

The room may include a fold-out table that can be moved from a storage position to an operative position in relation to the chair so that when the passenger is seated on the chair the passenger can use the fold-out table as a work or a meals/drinks platform.

The room may include a side ledge that houses the fold-out table in a stowed position. The table may be in a vertical orientation in the stowed position.

The section of the side of the aircraft that forms a part of the perimeter wall of the room may include at least one external window.

The aircraft may include a nose, a tail, and a body between the nose and the tail, with the body including opposed sides, typically with windows in the sides, and the above-described passenger room in the body section.

In more particular terms, the invention provides an aircraft that includes at least one passenger room in the aircraft, with the room being defined by a perimeter wall that encloses a passenger space, the wall including a section of a side of the aircraft and an internal wall with an opening to allow access to and from the room (which may be closed by a door), and with the room including a passenger chair and a bed that are separate units that can be used at the same time without one unit interfering with the other unit and vice versa, with the chair being adapted to swivel about a vertical axis and to recline between an upright position and a reclined position, with the bed being moveable between a stowed position that has a minimal footprint in the passenger space and an operative position in which the bed defines a sleeping platform within the passenger space, with the bed being positioned to extend lengthwise inwardly from the side of the aircraft into the passenger space when the bed is in the operative position and being positioned against a section of the perimeter wall that extends inwardly from the side of the aircraft when in the stowed position.

The extent of the swivel may be at least 90. The extent of the swivel may be at least 120. The swivel may be up to 135. The swivel may be up to 205. The swivel may be up to 270

The aircraft may include two of the above-described rooms adjacent each other with a section of the perimeter wall of each room defining a common wall between the rooms. The common wall may be an extendible/retractable wall such that the wall can be extended or retracted between a lowered position and a retracted position. The extendible/retractable wall may include a plurality of panels arranged to telescope together. The beds of the adjacent compartments may be against the common wall. With this arrangement, in the retracted position, the beds may be movable from the stowed to the operative positions and in the operative positions define a double bed arrangement.

The invention also provides a passenger room in an aircraft, the room being defined by a perimeter wall that encloses a passenger space, the wall including a section of a side of the aircraft and an internal wall with an opening to allow access to and from the room (that may be closed by a door), and with the room including a passenger chair and a bed that are separate units that can be used at the same time without one unit interfering with the other unit and vice versa, with the chair being adapted to swivel about a vertical axis and to recline between an upright position and a reclined position, with the bed being moveable between a stowed position that has a minimal footprint in the passenger space and an operative position in which the bed defines a sleeping platform within the passenger space, with the bed being positioned to extend lengthwise inwardly from the side of the aircraft into the passenger space when the bed is in the operative position and being positioned against a section of the perimeter wall that extends inwardly from the side of the aircraft when in the stowed position.

Various features, aspects, and advantages of the invention will become more apparent from the following description of embodiments of the invention, along with the accompanying drawings in which like numerals represent like components.

BRIEF DESCRIPTION OF THE DRAWINGS

One but not the only embodiment of an aircraft passenger room of the invention is illustrated by way of example only, and not by way of limitation, with reference to the accompanying drawings, of which.

DETAILED DESCRIPTION

The invention is now described more fully hereinafter with reference to the accompanying drawings, in which one embodiment, although not the only possible embodiment, of the invention is shown.

The invention may be embodied in many different forms and should not be construed as being limited to the embodiment described below.

Figure 6:
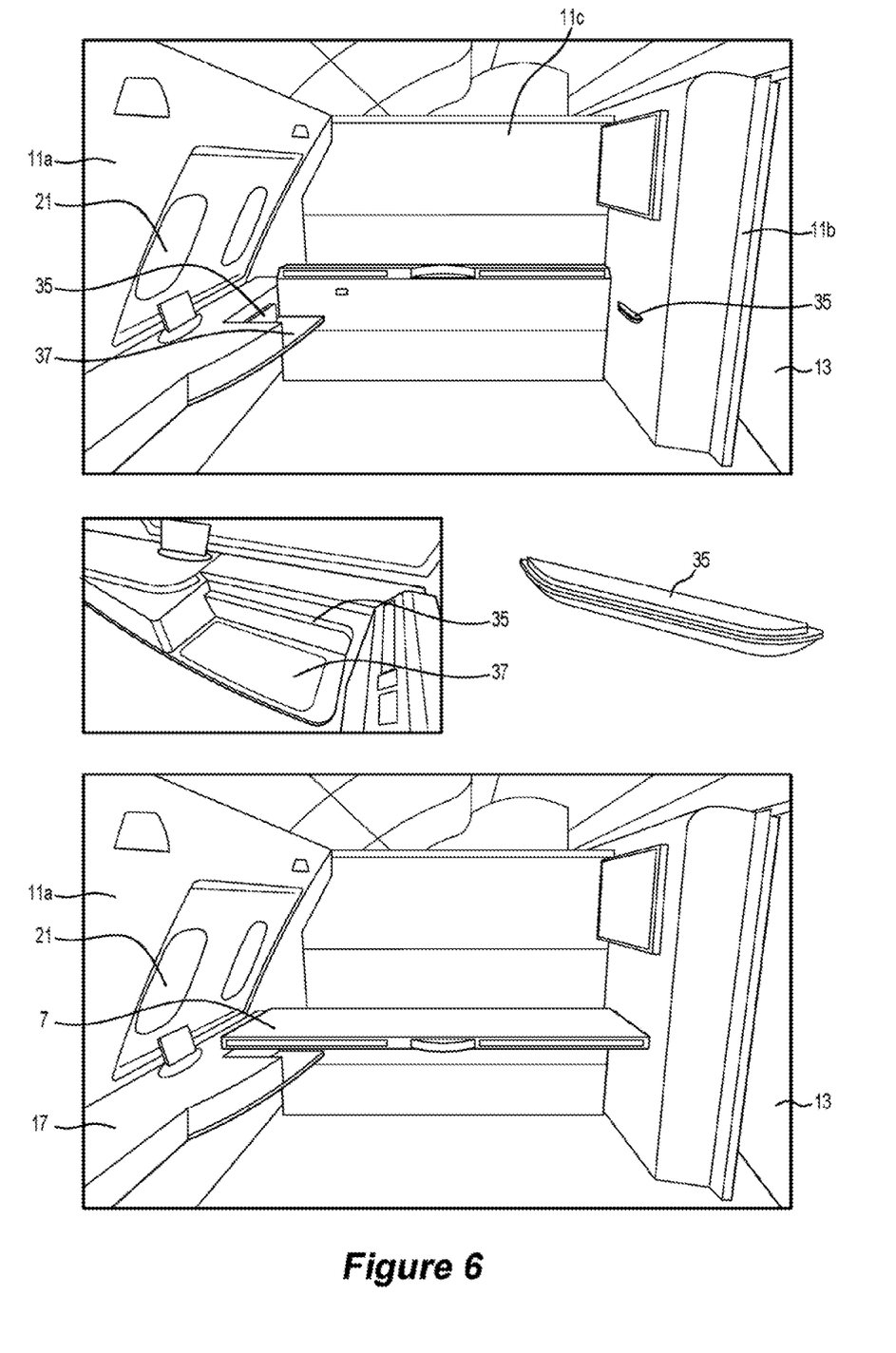
FIG. 6 is a series of perspective views of the embodiment that illustrate the embodiment from different orientations to the plan views of FIGS. 1-5 and, in particular, illustrate support members for the bed when the bed is in the operative position.
Figure 7:
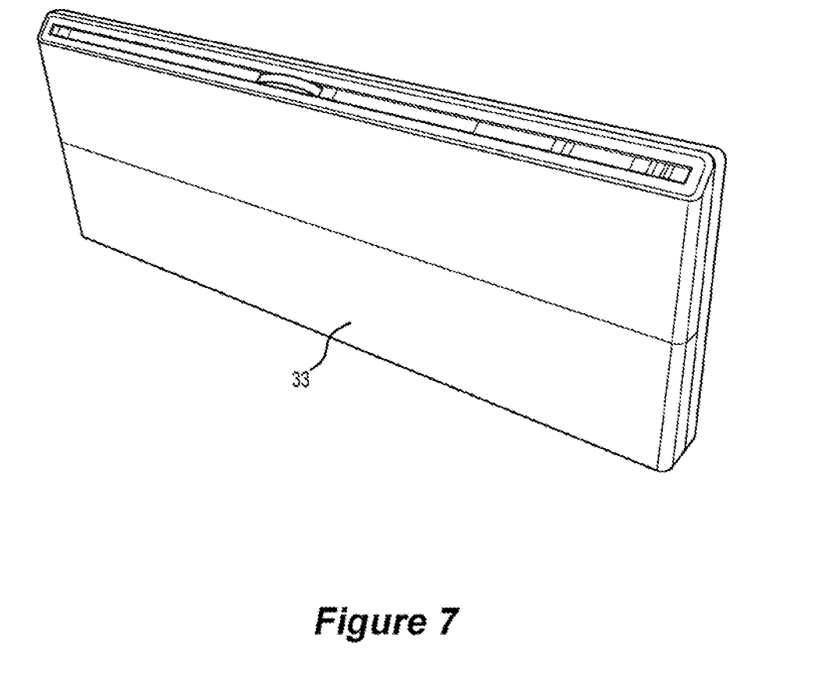
FIG. 7 is a perspective view of a cassette-type bed storage unit of the embodiment.
Figure 8:
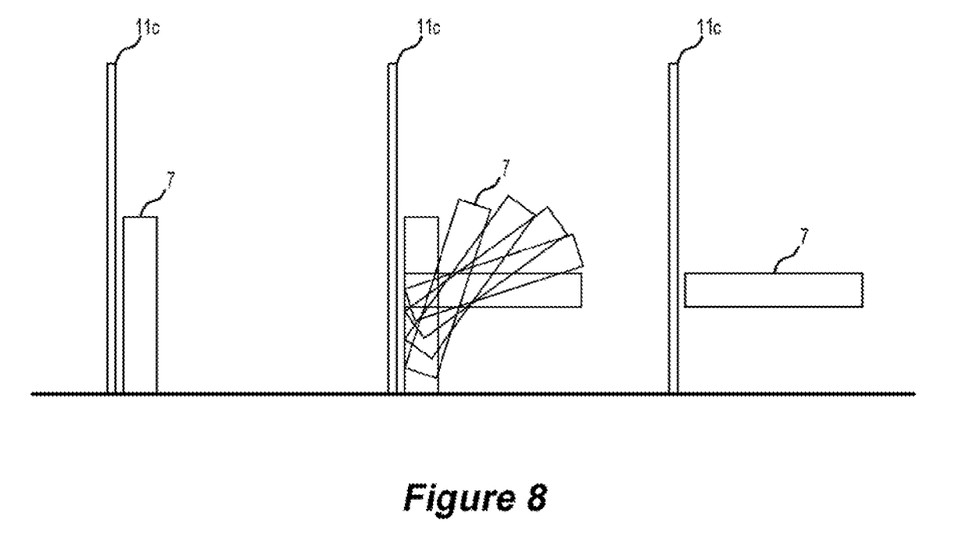
FIG. 8 is a series of diagrammatic cross-sections that illustrate the bed of the embodiment in stowed and operative positions and between these positions.
Figure 10:
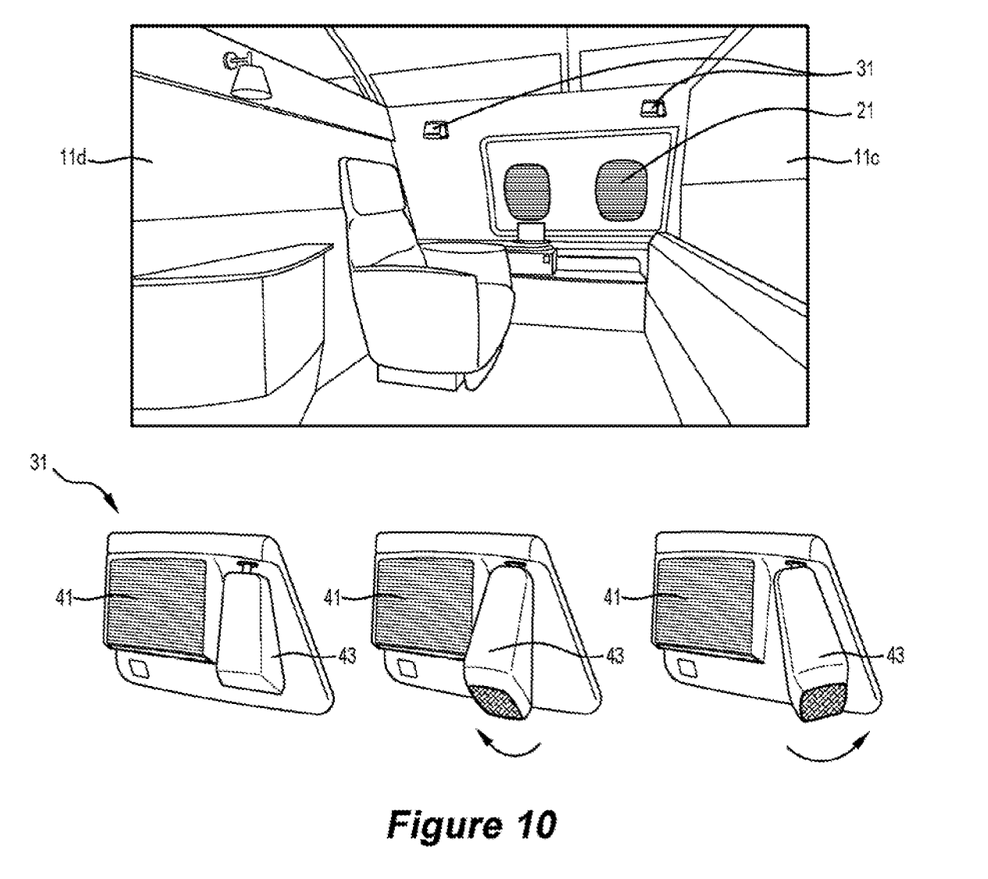
FIG. 10 is a perspective view that illustrates the location of two ambient and task light units shown in FIG. 9 on an internal wall section of the embodiment and various inoperative and operative positions of one of the ambient and task light units.

FIGS. 1-5 are a series of plan views of an embodiment of a passenger room 3 in an aircraft (only partially shown) that illustrate a number of different configurations for the room furniture. The Figures show the versatility and functionality of the room 3 that make the room a step change from current options for higher fare category passengers. The images in FIGS. 6 and 10 illustrate further the ambience, including a sense of space and privacy, of the embodiment of the room 3. The other Figures illustrate features of the room and further show the versatility of the room.

It is noted that the invention is not confined to the particular embodiment shown in the Figures.

It is also noted that the invention is not confined to any particular type of passenger aircraft.

The room 3 defines a generally rectilinear passenger space generally identified by the numeral 9. It is noted that the invention is not confined to this particular shape and size for the passenger space. By way of example, it is noted that different shaped and sized passenger spaces may be provided on a given aircraft or on different aircraft. By way of particular example, it is noted that the cabin shape at the front of an aircraft may make it appropriate to have different shaped and sized passenger spaces in the front row compared to successive rows.

The room 3 is characterised by two key pieces of furniture, namely a passenger chair 5 and a bed 7, that are positioned within the passenger space 9 as separate units that can be used at the same time without one unit interfering with or restricting the full range of operations of the other unit and vice versa. It is noted that, other than the requirement for the two key pieces of furniture described in the preceding sentence, the invention is not confined to the particular layout of the furniture in the room shown in the Figures.

This independent functionality of the chair 5 and the bed 7 is achieved by appropriate selection of the room size and shape and appropriate selection of the positions of the chair 5 and the bed 7 in the room.

The room 3 is defined by a perimeter wall that encloses the passenger space 9. The perimeter wall includes a section of a side 11a of the aircraft and an internal wall with wall sections 11b, 11c, and 11d. The section 11a of the aircraft side of the perimeter wall includes two aircraft windows 21 (see FIGS. 6, 10, 11). The wall section 11b is parallel to the section 11a of the aircraft side. The wall section 11b includes an opening for passenger access. The room 3 includes a door 13 mounted for sliding movement within the opening. The wall section 11b includes a cavity 15 on one side of the door opening to receive the door 13 when the door 13 is in an open position. The door 13 may be supported for sliding movement on any suitable tracks (not shown) or otherwise. The wall sections 11c, 11d are parallel to each other and extend between the section 11a of the aircraft side of the perimeter wall and the wall section 11b of the perimeter wall. It is evident from FIGS. 6, 10, 11 that the wall sections 11b, 11c, 11d are quite high, creating a real sense of privacy within the room 3. The wall height may be selected as required. When the door 13 is closed, the closed door 13 and the perimeter wall 11a, 11b, 11c, 11d define an enclosed and private space.

The chair 5 is adapted to swivel about a vertical axis to allow a passenger to move the chair 5 in an arc to position the chair 5 in a number of functional positions shown in FIGS. 1-3 and 5 and described further below. The chair 5 is also adapted to recline between an upright position (see FIG. 1) and a reclined position (see FIG. 3). The chair 5 can rotate more than 90 degrees other than during taxi, take-off and landing (TTOL). Current aviation regulations require that the chair 5 be facing forward for TTOL. The chair 5 may be reclined up to 22 and in some instances up to 30 during TTOL. The chair 5 has the following features.

The chair 5 may be any suitable chair. By way of example, the chair 5 may be an authentic leather chair upholstered by Poltrona Frau.

Figure 1:
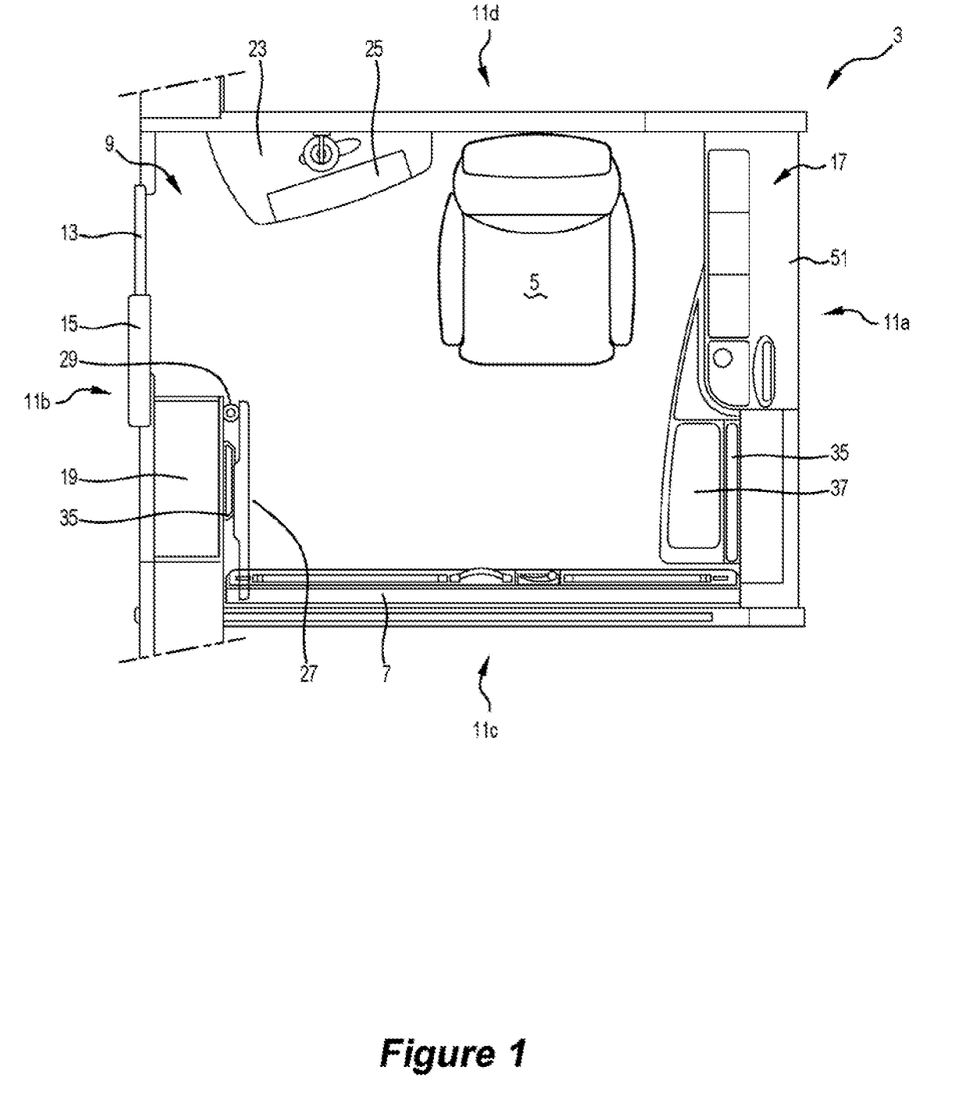
FIG. 1 is a plan view of the embodiment of the aircraft room with a chair in a take-off or landing position and other furniture, including a bed and a side table, in a stowed position for take-off or landing.
Figure 2:
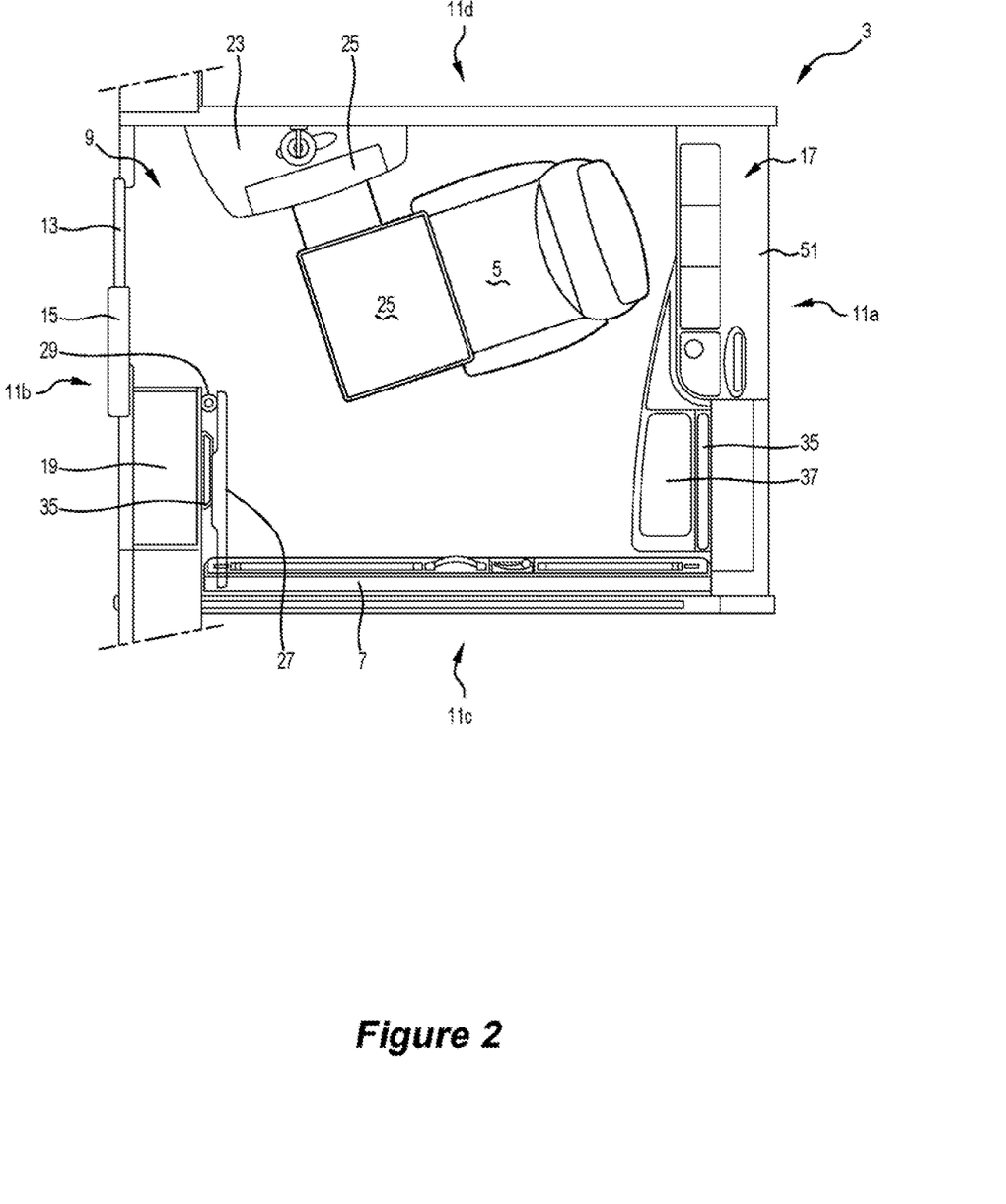
FIG. 2 is another plan view of the embodiment with the side table deployed in relation to the chair in the room.
Figure 3:
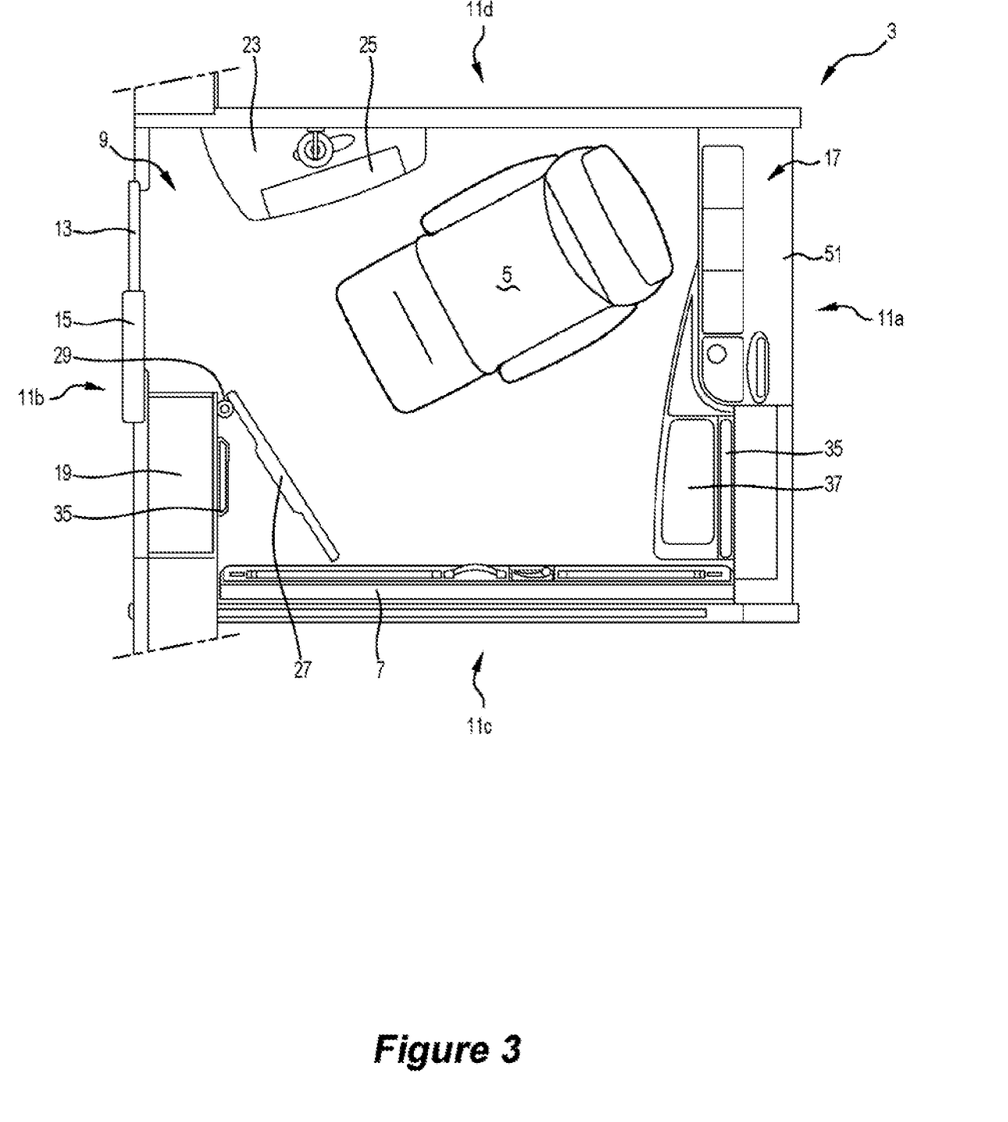
FIG. 3 is another plan view of the embodiment with the chair in a lounge position in the room.

FIG. 1 shows the functionality of the chair 5 to rotate up to 135 (and up to 270 for Rooms 1A/F), thereby providing significant freedom of chair movement.

Whilst not shown in the Figures, the chair 5 can be certified for up to 22 and in some instances for up to 30 recline during TTOL.

TTOL aside, the chair back is capable of reclining up to 45.

The chair 5 also has a leg rest that can be inclined up to 89 and retracted up to 15, so as to provide maximum comfort for passengers of all heights.

All chair rotation, chair back recline and leg rest incline described above are electronically actuated and controlled by a Seat Control Unit (SCU) located in the left arm rest of the chair 5.

The SCU has a capacitive touch screen that provides haptic feedback.

The bed 7 is moveable between a vertical stowed position against the section 11c of the perimeter wall (see FIG. 1) that has a minimal footprint in the passenger space 9 and an operative position (see FIG. 4) in which the bed 7 defines a sleeping platform within the passenger space. The bed 7 is positioned to extend inwardly of and along the length of the section 11c of the aircraft side into the passenger space when the bed 7 is in the operative position. This orientation is perpendicular to the length of the aircraft. The bed 7 is positioned vertically against the wall section 11c when the bed 7 is in the stowed position and thereby minimizes the footprint of the bed 7 in the room.

Figure 11:
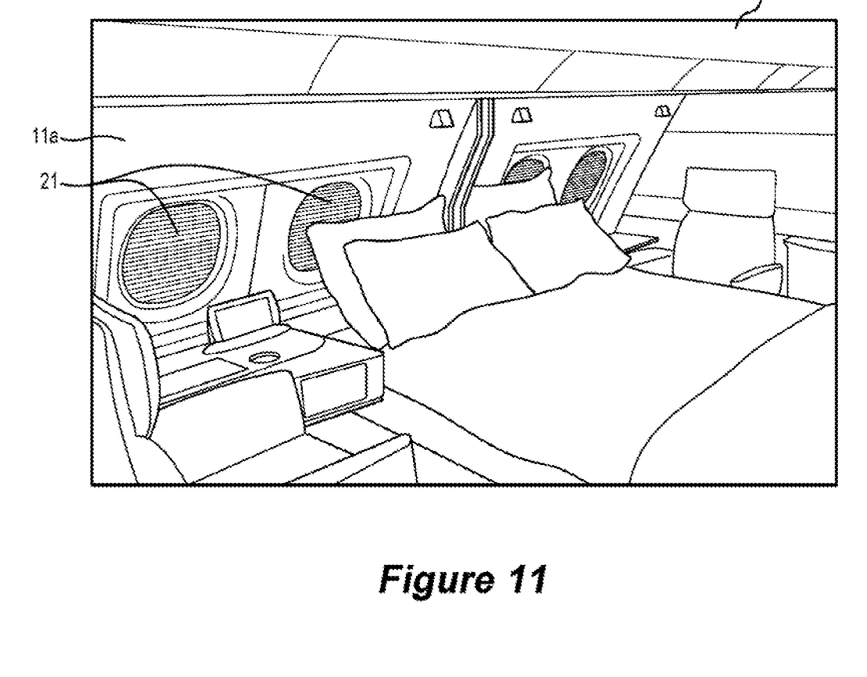
FIG. 11 is a perspective view that illustrates two adjacent rooms with the separate beds of each room arranged in operative positions and forming a double bed.
Figure 12A:
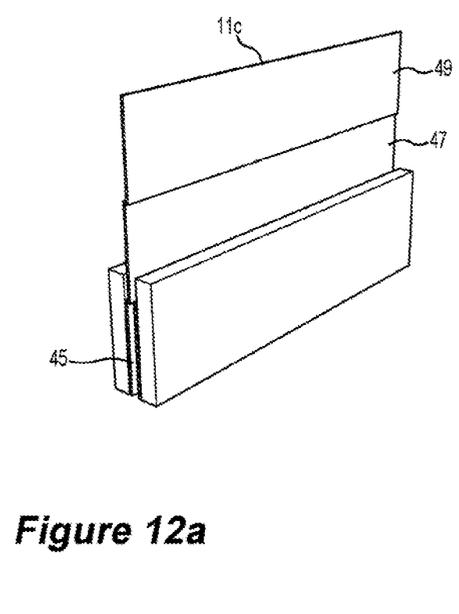
FIG. 12a-12f are a series of diagrams that illustrate a common internal wall section between the two adjacent rooms, with the common wall being shown in an extended positon that separates the two rooms and in a retracted position forming a double bed room.
Figure 12B:
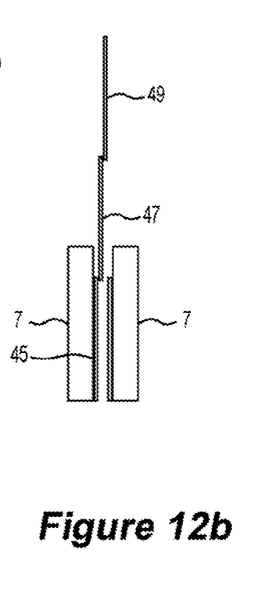
Figure 12C:
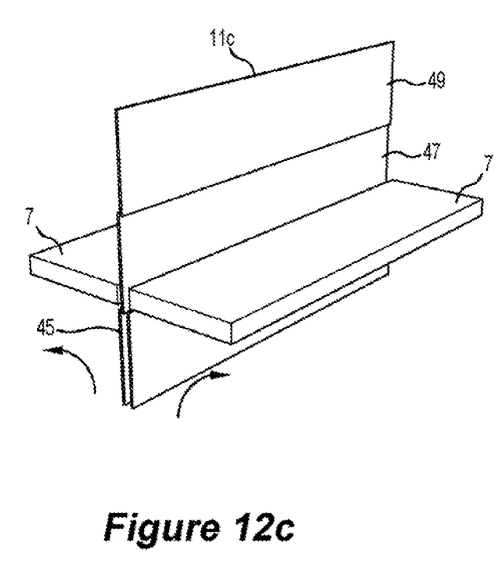
Figure 12D:
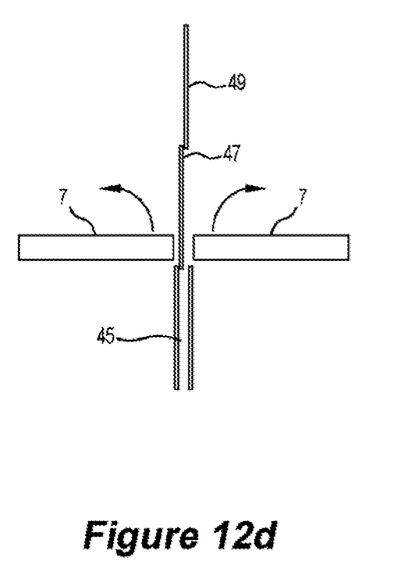
Figure 12E:
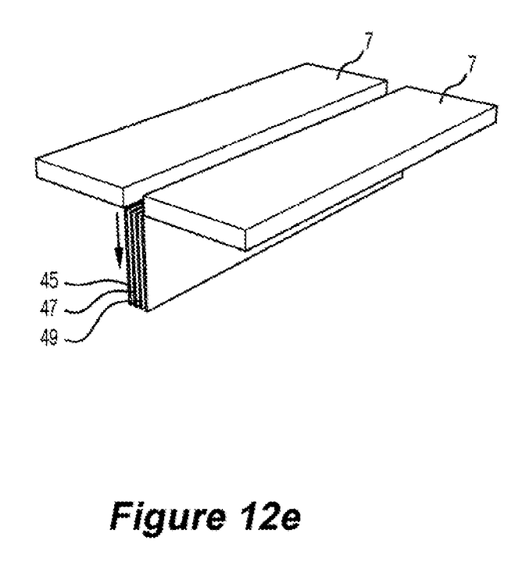
Figure 12F:
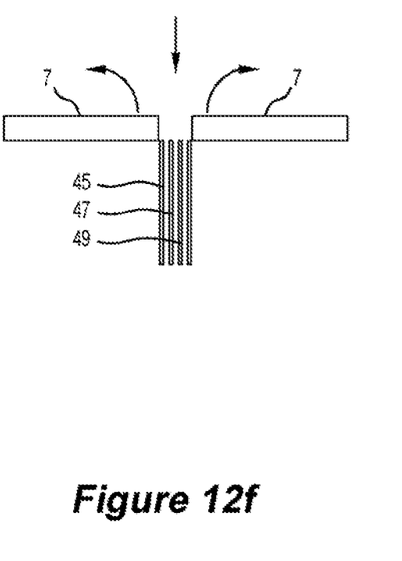

The headrest of the bed 7 has adjustable recline positions, up to 45°. This is shown in FIG. 11. Passengers can easily manually adjust the headrest's recline via a lever (not shown) located on the bed.

In addition to the above-mentioned chair 5 and bed 7, the other furniture items include the following items.

(a) A credenza 17 is positioned to extend along a section of the section 11a of the aircraft side. The credenza 17 includes a flat work surface 51 and at least one compartment (not shown) for storing items, as may be required by a passenger. The chair 5 and the credenza 17 are positioned relative to each other so that when the passenger is seated on the chair 5, the passenger can conveniently swivel the chair 5 to position himself or herself to face the credenza 17 and the aircraft window 21 above the credenza 17—see FIGS. 6 and 10. In this position, the passenger can readily access the storage compartment(s) in the credenza 17.

(b) A wardrobe 19 is positioned in the corner of the wall sections 11b, 11c against these wall sections. The wardrobe 19 can be accessed via an opening (not shown) in a short side of the wardrobe 19 adjacent the door opening.

(c) A side ledge 23 is positioned adjacent the door opening 13 within the swivel range of the chair 5. The side ledge 23 is a convenient surface for a passenger to use when the chair 5 is in the positions shown in FIGS. 1 and 2.

(d) The side ledge 23 houses a fold-out table 25 in a vertical stowed orientation. A passenger can lift and fold the table 25 to an operative position shown in FIG. 2 in relation to the chair 5 shown in the position of FIG. 2. In this position, a passenger seated on the chair 5 can use the fold-out table 25 as a work or a meals/drinks platform.

(e) A video monitor 27 is positioned in the same corner as the wardrobe 19 and is mounted to the wardrobe 19. The video monitor is mounted for rotation about a vertical pivot axis 29 so that the video monitor can be viewed conveniently when a passenger is in the chair 5 when positioned in the orientation shown in FIG. 3 or when the passenger is on the bed 7 when the bed is in the operative position shown in FIG. 4.

Figure 9:
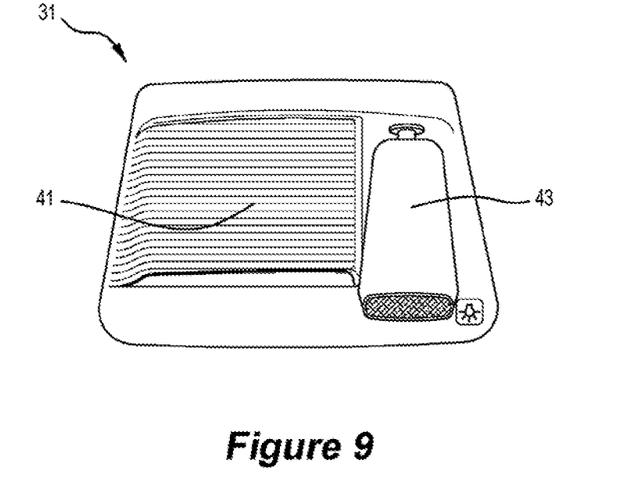
FIG. 9 is a perspective view that illustrates one of a number of ambient and task light units of the embodiment.

(f) A plurality of wall lamps 31 in the form of ambient and task light units are positioned in a number of locations in the room. By way of example, two wall lamps 31 are positioned on the section 11a of the aircraft side of the perimeter wall (see FIG. 10). Each wall lamp 31 integrates an ambient light 41 and a task light 43. The task light 43 is designed to be a movable part that can be pulled out, rotated and stowed back into the lamp, in order to suit all reading/working angles. More particularly, the task light 43 is movable between a stowed position shown in FIG. 9 and multiple operative positions as shown in the centre and the right hand images in the line of three images in FIG. 10. It is clear from these images that the task light 43 can be tilted upwardly/downwardly and from side to side. The ambient lamp 41 and the task light 43 have a range of intensities (low, medium, high) that can be controlled separately, so as to cater to all purposes and moods. The ambient lamp 41 and the task light 43 (and their 3 levels of light intensities) can be controlled independently by a Wireless Seat Control Unit (WSCU), which may be any suitable size, such as the size of an iPad tablet. Each wall lamp 31 also includes a capacitive switch (not shown) on the bottom right hand corner of the lamp. The switch is programmed to cycle through available light settings options of the wall lamp, so that a passenger can manually control the lamps via these switches and from the WSCU.

(g) A bed storage cassette 33 is provided for storing the bed 7 in the vertical orientation along a longer edge of the bed 7 in the stowed position. The cassette 33 is positioned against the wall section 11c of the perimeter wall. The cassette 33 includes a cavity for receiving and housing the bed 7 in the stowed position and a cantilever assembly and fixed support members 35 (described in paragraph (h) below) for supporting the bed 7 in the operative position shown in FIG. 4.

Figure 4:
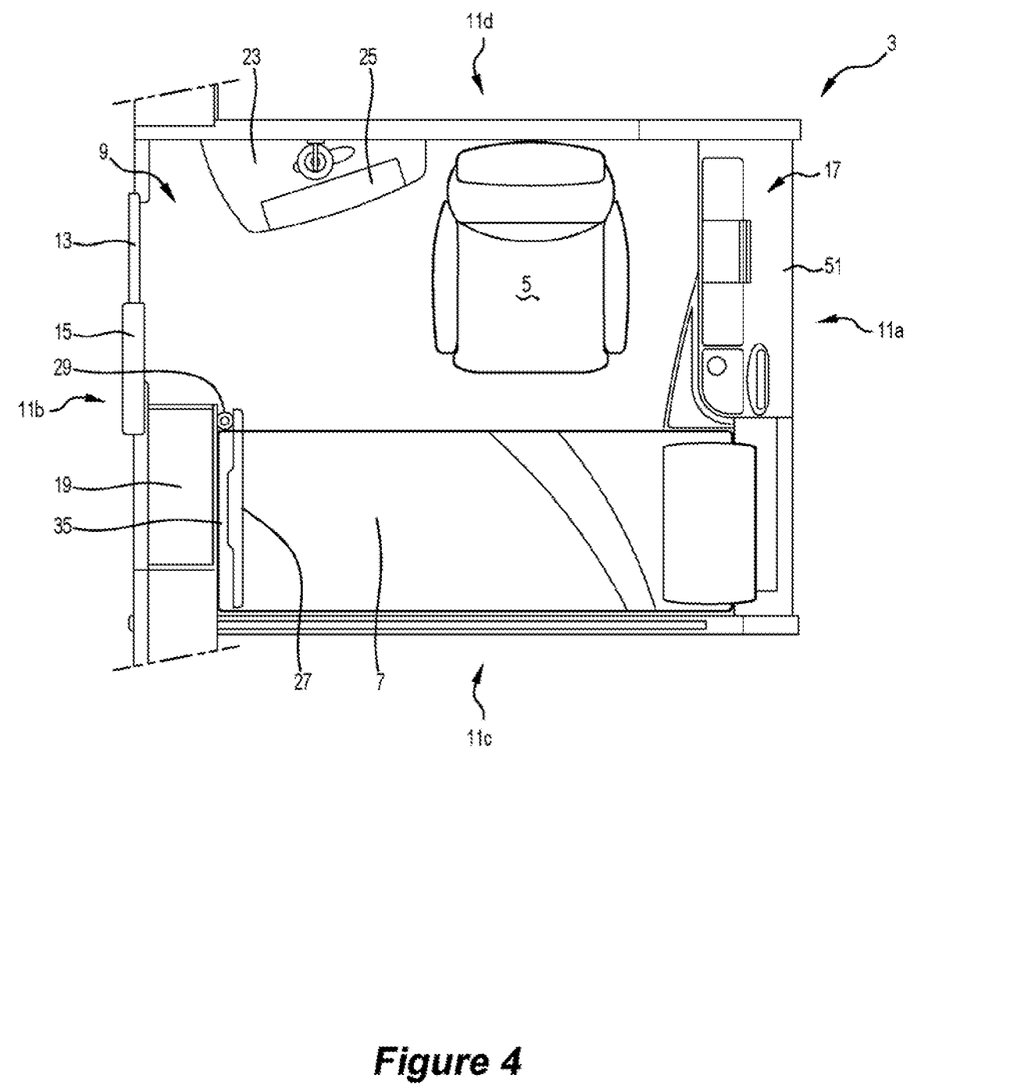
FIG. 4 is another plan view of the embodiment with the bed deployed in an operative position in the room.
Figure 5:
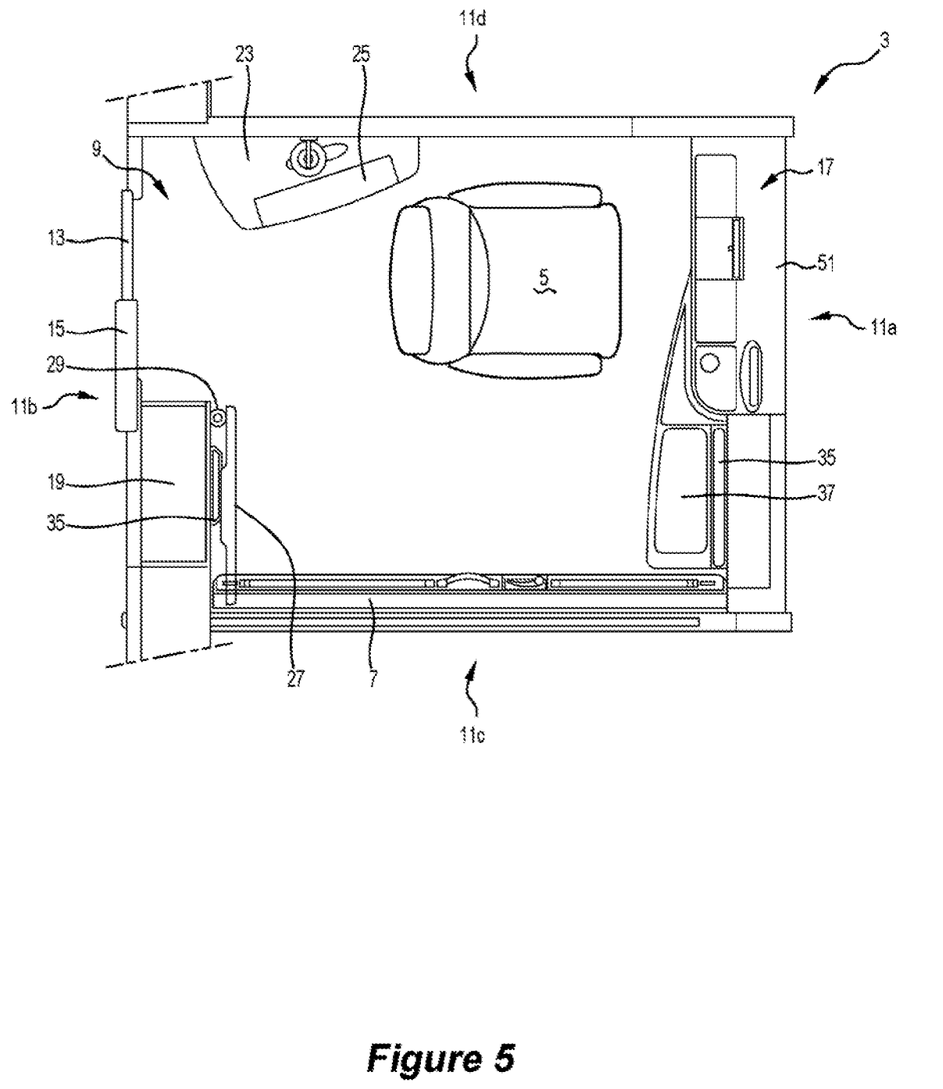
FIG. 5 is another plan view of the embodiment with the chair facing an aircraft window.

(h) Support members 35 are provided to support the bed 7 when the bed 7 is in the operative position shown in FIG. 4. The support members 35 are elongate members at opposite ends of the bed 7 that support the bed 7 at least substantially across the width of the bed ends.

(i) The bed 7 includes a lift-assist mechanism (not shown) for assisting movement of the bed from the stowed position to the operative position. The lift-assist mechanism is located at opposite ends of the bed 7 and is mounted to and supported by the perimeter wall. The lift-assist mechanism includes one or more than one spring unit that is in an extended position when the bed is in the stowed position that provides a positive upward force to assist movement of the bed from the stowed position to the operative position. The spring unit(s) may be a spring retractable reel unit that includes a coiled spring fixed to the perimeter wall and a line that connects the coiled spring and the bed. The lift-assist mechanism has the effect of making the bed 7 seem lighter than it is during deployment form the stowed position to the operative position.

(j) A platform 37 is positioned adjacent the credenza 17 against the section 11a of the aircraft side of the perimeter wall. The platform 37 is below the level of the bed 7 when the bed is in the operative position shown in FIG. 4. The platform 37 may be used for storage.

(k) The wall section 11c of the perimeter wall defines a common wall between adjacent rooms in the embodiment shown in the Figures. In the embodiment shown in the Figures, the wall section 11c may be formed as an extendible/retractable wall with a base panel 45 that defines a cavity for two additional panels 47, 49, with the panels 47, 49 connected together and arranged to telescope between a fully retracted position with the panels 47, 49 within the base cavity panel 45 and a fully extended position with the panels 47, 49 extending upwardly and defining the full height of the common wall. It can be appreciated that when the panels 47, 49 are in the fully retracted position, the two adjacent rooms are opened up to form a double-room, With this arrangement, the beds 7 in the rooms can be moved from the stowed positions with the beds located in the cassettes 33 to operative positions in which the beds 7 form a double bed as shown in FIG. 11. FIG. 12a-12f includes a series of diagrams that illustrate the common wall in the retracted and extended positions and the beds 7 in the stowed and operative positions.

One feature of the room that is not described in detail above is that the room is a technologically advanced room in terms of allowing a passenger to control multiple options, such as lighting, VIDEO MONITOR, etc. from controllers described above as the Seat Control Unit (SCU) located in the left arm rest of the chair 5 and the Wireless Seat Control Unit (WSCU), which may be essentially of the size of an iPad tablet. In addition, the room includes power access for laptops and other electronic devices.

It is evident from the above description of the embodiment shown in the Figures and from the Figures themselves that there is considerable flexibility in the options available to a passenger in the room. By way of example, the room has the following advantages An authentic leather chair 5 with the comfort level of a home couch can be provided, which passengers can both swivel and recline, instead of being limited to a typical forward-facing direction, passengers can rotate the chair 5 to the direction of their desire, be it facing the window, side table 23, video monitor 27, bed 7, credenza 17, or anywhere in between.

A full single-sized bed 7 is deployable next to the chair 5 which allows passengers to easily move to a more relaxed/sleeping position without the trouble of having to operate any buttons/switches or transforming his/her chair into a bed, which can be likened to seamlessly moving from one's office to bedroom.

The chair 5 and the bed 7 are positioned within the passenger space 9 as separate units that can be used at the same time without one unit interfering with or restricting the full range of operations of the other unit and vice versa.

The room has sufficient space for passengers to invite a fellow passenger over for a chat over tea, or even dine together.

Couples flying together can enjoy a private sanctuary that allows them to sleep comfortably next to each other.

It will be appreciated by persons skilled in the art that numerous variations and modifications may be made to the above-described embodiments, without departing from the scope of the following claims. The present embodiments are, therefore, to be considered in all respects as illustrative and not restrictive.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. An aircraft having a fuselage, said fuselage comprising:
a longitudinally extending side of the aircraft, and
a passenger interior having a plurality of passenger rooms disposed along said longitudinally extending side, and at least one longitudinal row adjacent to said plurality of passenger rooms,
wherein at least one passenger room,
has a passenger space that is defined by a perimeter wall that encloses a passenger space, the perimeter wall including a section of the side of the aircraft and an internal wall having an opening to allow passenger access between the passenger room and the longitudinal row,
wherein the passenger room includes a passenger chair and a bed that are separate units that can be used at the same time without one unit interfering with the other unit and vice versa,
wherein the room includes a storage cassette for storing the bed in a stowed position that has a minimal footprint in the passenger space,
wherein the bed is moveable between the stowed position in the cassette and an operative position in which the bed defines a sleeping platform within the passenger space,
wherein the stowed position is a vertical orientation along a longer edge of the bed,
wherein the operative position is a position in which the bed extends lengthwise inwardly from the side of the aircraft into the passenger space,
wherein the storage cassette and the bed are positioned against a section of the perimeter wall that extends inwardly from the side of the aircraft,
wherein the room includes a section of the perimeter wall that is a common wall between the room and an adjacent room,
wherein the common wall is an extendible/retractable wall such that the wall can be extended or retracted between a lowered position and a retracted position, wherein the extendible/retractable wall includes a plurality of panels arranged to telescope together, and wherein the storage cassettes and the beds of the adjacent rooms are against the common wall, whereby when the extendible/retractable wall is in the retracted position, the beds can be moved from the stowed positions to the operative positions and in the operative positions define a double bed arrangement.

2. The aircraft defined in claim 1 wherein the chair is adapted to swivel about a vertical axis to rotate the chair to a number of different functional orientations within the room.

3. The aircraft defined in claim 2 wherein the extent of the swivel is at least 90°.

4. The aircraft defined in claim 2 wherein the extent of the swivel is up to 135°.

5. The aircraft defined in claim 2 wherein the extent of the swivel is up to 270°.

6. The aircraft defined in claim 1 wherein the chair is adapted to recline between an upright position and a reclined position.

7. The aircraft defined in claim 1 wherein the cassette includes a cantilever assembly for supporting the bed in the operative position.

8. The aircraft defined in claim 1 wherein the room includes members for supporting opposite ends of the bed when the bed is in the operative position.

9. The aircraft defined in claim 1 wherein the room includes a door for closing the opening in the inner wall of the perimeter wall.

10. The aircraft defined in claim 1 wherein the room includes at least one wall lamp that integrates an ambient light and an additional independently controllable task light.

11. The aircraft defined in claim 10 wherein the task light is movable between a stowed position and multiple operative positions.

12. The aircraft defined in claim 10 wherein the room includes a Wireless Seat Control Unit for remotely operating each of the ambient light and the task light.

13. The aircraft defined in claim 1 wherein the room includes a credenza positioned to extend along a section of the side of the aircraft.

14. The aircraft defined in claim 13 wherein the chair is positioned in relation to the credenza so that when the passenger is seated on the chair the passenger can access storage compartments in the credenza.

15. The aircraft defined in claim 1 wherein the room includes a fold-out table that can be moved from a storage position to an operative position in relation to the chair so that when the passenger is seated on the chair the passenger can use the fold-out table as a work or a meals/drinks platform.

16. An aircraft having a fuselage, said fuselage comprising:
a longitudinally extending side of the aircraft, and
a passenger interior having a plurality of passenger rooms disposed along said longitudinally extending side, and at least one longitudinal row adjacent to said plurality of passenger rooms,
wherein at least one passenger room has a passenger space that is defined by a perimeter wall that encloses a passenger space, the perimeter wall including a section of the-side of the aircraft and an internal wall having an opening to allow passenger access between the passenger room and the longitudinal row, wherein the room includes a passenger chair and a bed that are separate units that can be used at the same time without one unit interfering with the other unit and vice versa, wherein the room includes a storage cassette for storing the bed in a stowed position that has a minimal footprint in the passenger space, wherein the bed is moveable between the stowed position in the cassette and an operative position in which the bed defines a sleeping platform within the passenger space, wherein the stowed position is a vertical orientation along a longer edge of the bed, wherein the operative position is a position in which the bed extends lengthwise inwardly from the side of the aircraft into the passenger space, wherein the room includes a section of the perimeter wall that extends inwardly from the side of the aircraft and is a common wall between the room and an adjacent room, wherein the common wall is an extendible/retractable wall such that the common wall can be extended or retracted between a lowered position and a retracted position, and wherein the cassettes and the beds of the adjacent rooms are against the common wall, whereby when the extendible/retractable wall is in the retracted position, the beds can be moved from the stowed positions in the cassettes to the operative positions and in the operative positions define a double bed arrangement.

17. The aircraft defined in claim 16 wherein the chair is adapted to swivel about a vertical axis to rotate the chair to a number of different functional orientations within the room.

18. The aircraft defined in claim 17 wherein the extent of the swivel is at least 90°.

19. The aircraft defined in claim 17 wherein the extent of the swivel is up to 135°.

20. The aircraft defined in claim 17 wherein the extent of the swivel is up to 270°.

21. The aircraft defined in claim 16 wherein the chair is adapted to recline between an upright position and a reclined position.

22. The aircraft defined in claim 16 wherein the cassette includes a cantilever assembly for supporting the bed in the operative position.

23. The aircraft defined in claim 16 wherein the extendible/retractable wall includes a plurality of panels arranged to telescope together.

24. The aircraft defined in claim 16 wherein the room includes at least one wall lamp that integrates an ambient light and an additional independently controllable task light.

25. The aircraft defined in claim 24 wherein the task light is movable between a stowed position and multiple operative positions.

26. The aircraft defined in claim 24 wherein the room includes a Wireless Seat Control Unit for remotely operating each of the ambient light and the task light.

27. The aircraft defined in claim 16 wherein the room includes members for supporting opposite ends of the bed when the bed is in the operative position.

28. The aircraft defined in claim 16 wherein the room includes a door for closing the opening in the inner wall of the perimeter wall.

29. The aircraft defined in claim 16 wherein the room includes a credenza positioned to extend along a section of the side of the aircraft.

30. The aircraft defined in claim 29 wherein the chair is positioned in relation to the credenza so that when the passenger is seated on the chair the passenger can access storage compartments in the credenza.

31. The aircraft defined in claim 16 wherein the room includes a fold-out table that can be moved from a storage position to an operative position in relation to the chair so that when the passenger is seated on the chair the passenger can use the fold-out table as a work or a meals/drinks platform.

32. An aircraft having a fuselage, said fuselage comprising:
- a longitudinally extending side of the aircraft, and
- a passenger interior having a plurality of passenger rooms disposed along said longitudinally extending side, and at least one longitudinal row adjacent to said plurality of passenger rooms,
- wherein at least one passenger room has a passenger space that is defined by a perimeter wall that encloses a passenger space, the perimeter wall including a section of the side of the aircraft and an internal wall having an opening to allow passenger access between the room and the longitudinal row,
- wherein the room includes a passenger chair and a bed that are separate units that can be used at the same time without one unit interfering with the other unit and vice versa,
- wherein the room includes a storage cassette for the bed positioned against a section of the perimeter wall that extends inwardly from the side of the aircraft,
- wherein the storage cassette is provided for storing the bed in a vertical orientation along a longer edge of the bed in a stowed position,
- wherein the bed is moveable between the stowed position in the cassette and an operative position in which the bed extends lengthwise inwardly from the side of the aircraft into the passenger space against a section of the perimeter wall that extends inwardly from the side of the aircraft and defines a sleeping platform within the passenger space,
- wherein the cassette includes a cantilever assembly for supporting the bed in the operative position,
- wherein the section of the perimeter wall forms a common wall between the room and an adjacent room,
- wherein the common wall is an extendible/retractable wall such that the wall can be extended or retracted between a lowered position and a retracted position,
- wherein extendible/retractable wall includes a plurality of panels arranged to telescope together, and
- wherein the beds of the adjacent rooms are against the common wall, whereby when the extendible/retractable wall is in the retracted position, the beds can be moved from the stowed positions to the operative positions and in the operative positions define a double bed arrangement.

33. The aircraft defined in claim 32 wherein the chair is adapted to swivel about a vertical axis to rotate the chair to a number of different functional orientations within the room.

34. The aircraft defined in claim 32 wherein the chair is adapted to recline between an upright position and a reclined position.

* * * * *